(No Model.)

R. WATKINSON.
Coupling for Hose and other Pipes.

No. 235,475.   Patented Dec. 14, 1880.

Witnesses:
F. S. Blanchard.
W. A. Redmond.

Inventor:
R. Watkinson
by Munn & Co.
att'ys

UNITED STATES PATENT OFFICE.

ROBERT WATKINSON, OF SALFORD, COUNTY OF LANCASTER, ENGLAND.

COUPLING FOR HOSE AND OTHER PIPES.

SPECIFICATION forming part of Letters Patent No. 235,475, dated December 14, 1880.

Application filed July 3, 1880. (No model.) Patented in England August 22, 1876.

*To all whom it may concern:*

Be it known that I, ROBERT WATKINSON, of Salford, England, have invented new Improvements in Universal and other Joints for Coupling Hose and other Pipes; and I do hereby declare the following, when taken in connection with the accompanying drawings and the letters of reference marked thereon, to be a full, clear, and exact description of the same, and which said drawings constitute part of this specification, and represent, in—

Figure 1:
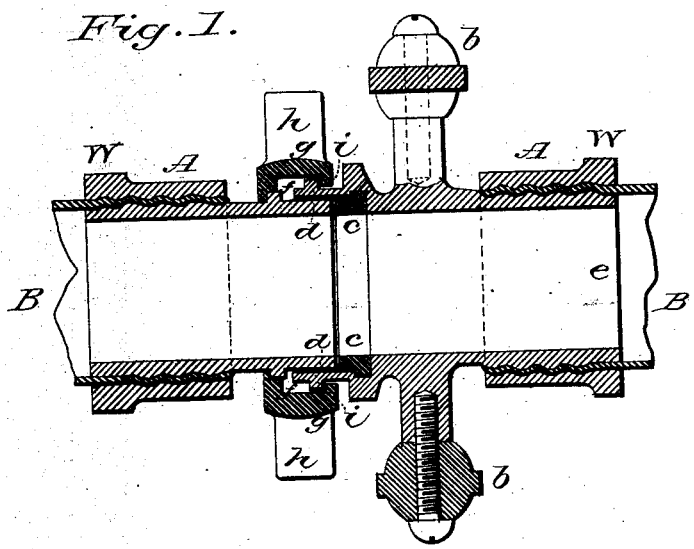
Figure 3:
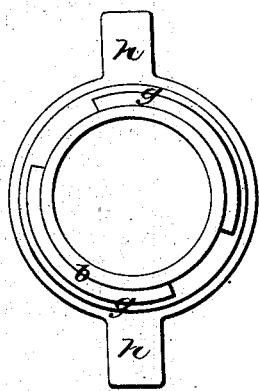
Figure 2:
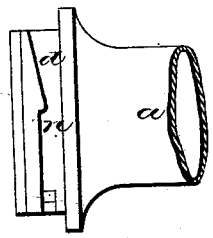

Figure 1, a section through union-coupling, with the worm-ferrules for connecting hose-pipe; Fig. 2, a side view of the end $a$ of Fig. 1 fitting into coupling lock-ring $g$; Fig. 3, a plan of ring $g$.

The universal-joint portion of this improvement was invented by me, and Letters Patent procured therefor in England on the 22d of August, 1876.

I will proceed to describe the purposes of the figures on the drawings, which are marked by corresponding letters of reference.

$a$ and $e$ in Fig. 1 are the two tail ends of my universal joint, on which are screwed ferrules A A, between which and such tails are two ends of hose-pipes to be coupled up, and marked B. These ferrules and tail-pieces are made slightly conical, to increase the tightness by screwing up. To the outside of the tail-piece $e$ are cast projections for the screws of the swivels $b\ b$. At the other or inner end of such is an annular recess to receive a flange or ring of india-rubber or other equivalent, $c$ $c$, and on the outer side of such end are cast or cut segmental projections of a cam shape, (marked $d$.) The second tail-piece, $a$, is secured to the other end of hose-pipe by similar ferrule A, the inner or bush end of which is made to fit the ring of india-rubber or other equivalent, $c$, the flange $f$ projecting from this bush, and serves as an abutment for the union coupling-piece $g$, (shown detached in Fig. 3,) which is also provided with segmental ribs $i$ and recesses corresponding with those on the bush end of tail-piece $a$, but inversely. The coupling-bush $g$ is also provided with lugs, (marked $h$.) When two hose-pipes are to be coupled no wire, spring, or clips are required, the ferrule A being drawn over the end of each pipe far enough to leave sufficient space to draw or screw over the tail-pieces $a$ and $e$, after which the ferrules A are brought forward and screwed over the hose-pipe ends onto tail-pieces $a$ and $e$ by hand-tongs or screw-key. The two hose-pipes are now secured to the tail-pieces or ferrule ends of the coupling. The two cam-swivels on the outside of inner end of tail-piece $a$ act inside union coupling-piece $g$. There is a small recess in the cam-swivels (marked $n$,) which, on coming fair with the projection inside union-couplings, lock the joint firmly. The inclined surfaces of the segmental projections or cams $d$ and $i$ cause the end of the bush $e$ to compress the india-rubber or other ring $c$, thereby forming an air and water tight joint. The elasticity of ring $c$ forms a spring, which causes the shoulder on the segmental projection or cam $d$ (shown in Fig. 2) to lock the parts together. The inward pressure likewise improves the joints. In uncoupling, the attendant must exert sufficient end pressure on the ends $a$ and $e$ to liberate the shoulder above referred to in recesses $n$, after which the union coupling-piece can be turned back to unfasten the cam-joint.

What I claim as new is—

In a joint for hose-couplings and other pipes, the combination of the tail end $e$, having projection $d$, the rubber ring $c$, the tail end $a$, having flange $f$, and the bush $g$, having lugs $h$ and ribs $i$, substantially as shown and described.

ROBERT WATKINSON. [L. S.]

Witnesses:
ARTHUR C. HALL,
SYLVESTER FLAGLER,
*U. S. Consular Clerk, Manchester, England.*